United States Patent
Ogawa

(10) Patent No.: US 12,509,375 B2
(45) Date of Patent: Dec. 30, 2025

(54) DILUTE SOLUTION PRODUCTION APPARATUS

(71) Applicant: KURITA WATER INDUSTRIES LTD., Tokyo (JP)

(72) Inventor: Yuuichi Ogawa, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 538 days.

(21) Appl. No.: 17/800,527

(22) PCT Filed: Sep. 15, 2020

(86) PCT No.: PCT/JP2020/034828
§ 371 (c)(1),
(2) Date: Aug. 17, 2022

(87) PCT Pub. No.: WO2021/181729
PCT Pub. Date: Sep. 16, 2021

(65) Prior Publication Data
US 2023/0142129 A1    May 11, 2023

(30) Foreign Application Priority Data
Mar. 13, 2020 (JP) ................. 2020-044474

(51) Int. Cl.
*C02F 1/68* (2023.01)
*F04B 23/00* (2006.01)
*F04B 53/06* (2006.01)

(52) U.S. Cl.
CPC .............. *C02F 1/686* (2013.01); *F04B 23/00* (2013.01); *F04B 53/06* (2013.01); *C02F 2209/04* (2013.01)

(58) Field of Classification Search
CPC .. C02F 1/686; C02F 1/008; C02F 1/20; C02F 1/68; C02F 1/00; C02F 2209/04;
(Continued)

(56) References Cited

FOREIGN PATENT DOCUMENTS

| JP | 107227593 | 8/1995 |
| JP | 2000126752 | 5/2000 |

(Continued)

OTHER PUBLICATIONS

JP 2020025933 A English description, Feb. 20, 2020, Matsumoto Hideki.*

(Continued)

*Primary Examiner* — Akash K Varma
(74) *Attorney, Agent, or Firm* — JCIPRNET

(57) ABSTRACT

A dilute solution production apparatus produces a dilute solution of a second liquid containing at least one of a conductivity-imparting substance and an oxidation-reduction potential regulating substance by adding the second liquid to a first liquid, and is provided with: a first pipe through which the first liquid flows; a pump for adding the second liquid into of the first pipe via a second pipe; a degassing pipe which extends from the pump; a water quality sensor which is composed of a conductivity meter, a resistivity meter or an oxidation-reduction potential meter; and a control device for opening a degassing valve when a water quality detection value in the water quality sensor varies by a predetermined value or more.

2 Claims, 2 Drawing Sheets

(58) Field of Classification Search
CPC ............ C02F 2209/005; C02F 2209/05; C02F 2209/40; C02F 2103/04; B01D 19/00; B01F 23/40; H01L 21/304; F04B 23/00
USPC .......................................................... 210/87
See application file for complete search history.

(56) References Cited

FOREIGN PATENT DOCUMENTS

| | | | |
|---|---|---|---|
| JP | 2006297267 | 11/2006 | |
| JP | 2010162476 | 7/2010 | |
| JP | 2018171610 | 11/2018 | |
| JP | 2018206998 | 12/2018 | |
| JP | 2020025933 | 2/2020 | |
| JP | 2020025933 A * | 2/2020 | ................ C02F 1/50 |
| TW | 201836988 | 10/2018 | |

OTHER PUBLICATIONS

"Office Action of Taiwan Counterpart Application", issued on Sep. 4, 2024, with English translation thereof, p. 1- p. 10.
"International Search Report (Form PCT/ISA/210) of PCT/JP2020/034828," mailed on Nov. 24, 2020, with English translation thereof, pp. 1-4.

* cited by examiner

DILUTE SOLUTION PRODUCTION APPARATUS

CROSS-REFERENCE TO RELATED APPLICATION

This application is a 371 application of the International PCT application serial no. PCT/JP2020/034828, filed on Sep. 15, 2020, which claims the priority benefit of Japan Patent Application No. 2020-044474, filed on Mar. 13, 2020. The entirety of each of the above-mentioned patent applications is hereby incorporated by reference herein and made a part of this specification.

TECHNICAL FIELD

The present invention relates to a dilute solution production apparatus for producing a dilute solution of a substance such as a conductivity-imparting substance or an oxidation-reduction potential regulating substance by adding a small amount of a second liquid containing the substance to a first liquid such as ultrapure water.

RELATED ART

As a cleaning solution used for wafer processing in the electronic industry field, a solution obtained by adding a conductivity-imparting substance or an oxidation-reduction potential regulating substance to ultrapure water is used.

At that time, the conductivity-imparting substance or the oxidation-reduction potential regulating substance is added to the ultrapure water by a pump (Patent Documents 1 and 2).

In the case where the conductivity-imparting substance or the oxidation-reduction potential regulating substance is a substance that easily vaporizes, bubbles of the substance tend to accumulate in the pump. Particularly, a pump with an extremely low flow rate is vulnerable to clogging by bubbles, and when the bubbles accumulate, the pump becomes less able to discharge at a constant amount.

PRIOR-ART DOCUMENTS

Patent Documents

Patent Document 1: Japanese Patent Laid-open No. 2018-171610
Patent Document 2: Japanese Patent Laid-open No. 2018-206998

SUMMARY OF THE INVENTION

Problems to Be Solved by the Invention

The present invention aims to provide a dilute solution production apparatus in which a trace amount of a second liquid containing a conductivity-imparting substance or an oxidation-reduction potential regulating substance is added to a first liquid such as ultrapure water, and a dilute solution having a specified concentration can be stably produced.

Means for Solving the Problems

A dilute solution production apparatus according to a first invention produces a dilute solution of a second liquid containing at least one of a conductivity-imparting substance and an oxidation-reduction potential regulating substance by adding the second liquid to a first liquid. The dilute solution production apparatus is characterized by including: a first pipe through which the first liquid flows; a pump adding the second liquid into the first pipe via a second pipe; a degassing mechanism extending from the pump; a water quality detector composed of a conductivity meter, a resistivity meter, or an oxidation-reduction potential meter, provided downstream of a connection part in the first pipe with the second pipe; and a degassing mechanism control part operating the degassing mechanism when a water quality detection value of the water quality detector varies by a predetermined value or more.

A dilute solution production apparatus according to a second invention produces a dilute solution of a second liquid containing at least one of a conductivity-imparting substance and an oxidation-reduction potential regulating substance by adding the second liquid to a first liquid. The dilute solution production apparatus is characterized by including: a first pipe through which the first liquid flows; a pump adding the second liquid into the first pipe via a second pipe; a degassing mechanism extending from the pump; a flowmeter provided downstream of the pump in the second pipe; and a degassing mechanism control part operating the degassing mechanism when a detection value of the flowmeter varies by a predetermined value or more.

In one aspect of the present invention, a tank storing the second liquid is provided, and the second pipe is connected to the tank. The degassing mechanism includes a degassing pipe for guiding the second liquid mixed with a gas from the pump to the tank, and a valve provided in the degassing pipe. The degassing mechanism control part controls opening and closing of the valve.

In the present invention, examples of the conductivity-imparting substance and the oxidation-reduction potential regulating substance include, but are not limited to, ammonia, carbon dioxide, hydrogen peroxide, and ozone.

Effects of the Invention

According to the dilute solution production apparatus of the present invention, in the case where a gas accumulates in the pump for adding the second liquid to the first liquid such as ultrapure water, a discharge amount of the pump decreases, or the conductivity, resistivity or oxidation-reduction potential of the dilute solution accordingly varies by a predetermined value or more from a stable value up to that point, the degassing mechanism is operated to degas the pump, and the discharge amount of the pump is restored. Accordingly, it is possible to stably supply a dilute solution having a specified concentration.

DESCRIPTION OF THE EMBODIMENTS

Embodiments are described below with reference to the drawings.

Figure 1:
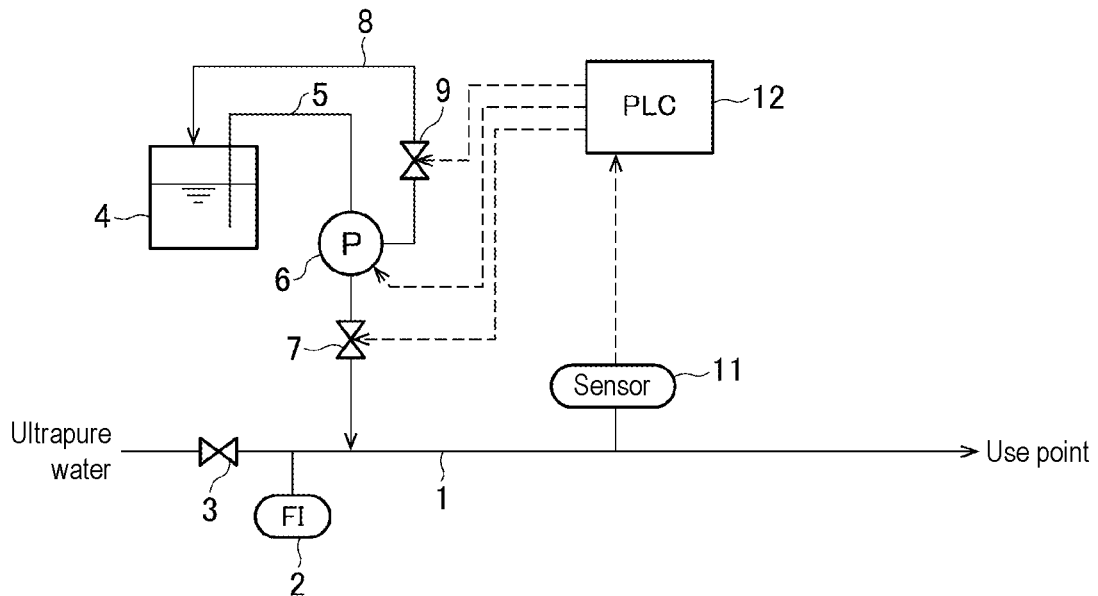
FIG. 1 is a configuration diagram of a dilute solution production apparatus according to an embodiment.

FIG. 1 shows an embodiment of a first invention.

Ultrapure water as a first liquid is supplied to a use point via a first pipe 1 having a flowmeter 2 and a valve 3. In the middle of this operation, a second liquid in a tank 4 is added via a second pipe 5, a pump 6 and a flow regulating valve 7. A degassing pipe 8 is provided so as to return, to the tank 4, the second liquid that contains a gas generated by the pump 6. A degassing valve 9 is provided in the degassing pipe 8. The degassing valve 9 may be provided in the middle of the degassing pipe 8, or may be provided at an upstream end or a downstream end thereof.

A solution of the aforementioned conductivity-imparting substance or oxidation-reduction potential regulating substance is stored in the tank 4.

A water quality sensor 11 as a water quality detector composed of a conductivity meter, a resistivity meter, or an oxidation-reduction potential meter (ORP meter) is provided downstream of a connection part (confluence part) in the first pipe 1 with the second pipe 5. A detection signal of the water quality sensor 11 is input to a control device (in this embodiment, a programmable logic controller (PLC)) 12. The pump 6, the flow regulating valve 7 and the degassing valve 9 are controlled by the control device 12.

In the dilute solution production apparatus configured in this way, in a steady state, the ultrapure water flows in the first pipe 1 at a constant flow rate, the second liquid flows in the second pipe 5 at a constant flow rate, and a dilute solution to which the second liquid is added so as to obtain a specified concentration is supplied to the use point.

When a gas separated from the second liquid, such as ammonia, carbon dioxide, hydrogen peroxide, or ozone, or a gas such as air, accumulates in the pump 6, a discharge amount of the pump 6 decreases, and a detection value of the water quality sensor 11 varies by a predetermined value or more (for example, 5% or more) from a stable value (value according to a target value) up to that point. In such a case where a water quality variation is detected, the control valve 12 opens the degassing valve 9 for a predetermined time, returns the second liquid mixed with the gas from the pump 6 to the tank 4, and returns the degassing valve 9 to a closed state after passage of the predetermined time. Accordingly, the discharge amount of the pump 6 returns to a steady-state amount, and ultrapure water containing the second liquid having the specified concentration is supplied to the use point.

In the above description, a case where a sensor detection value varies by 5% or more is described as an example. However, the present invention is not limited thereto. As a variation value of the sensor detection value, a value selected from a range of normally 1% to 10%, particularly 3% to 7%, may be adopted.

The same applies to a flowmeter 13 according to an embodiment of a second invention to be described next.

Figure 2:
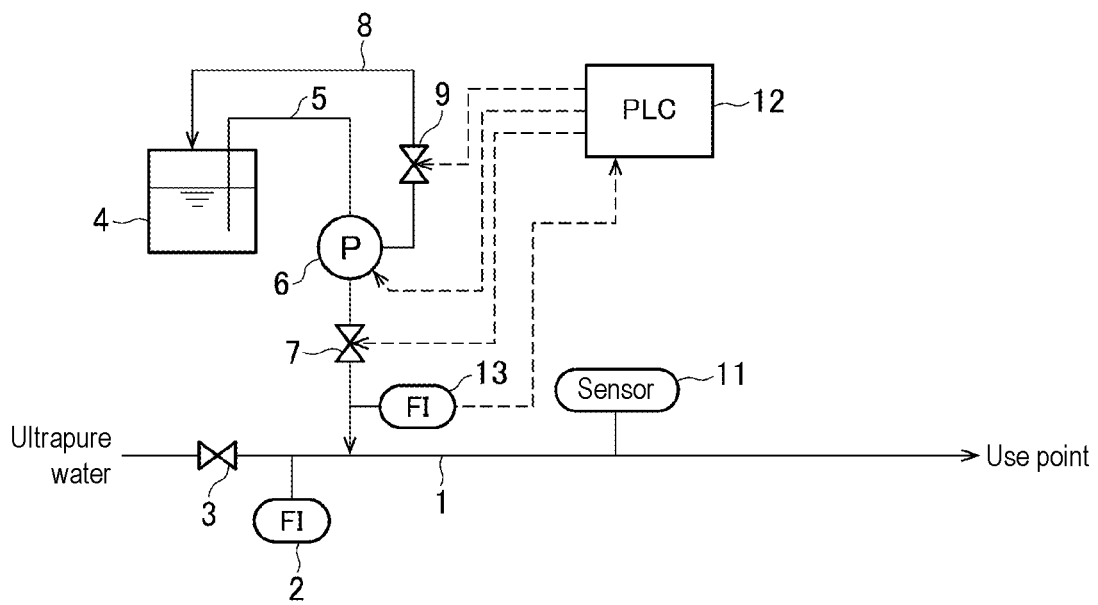
FIG. 2 is a configuration diagram of a dilute solution production apparatus according to another embodiment.

FIG. 2 shows an embodiment of a second invention. In this embodiment, the flowmeter 13 is disposed downstream of the pump 6 in the second pipe 5 (in this embodiment, downstream of the flow regulating valve 7). A detection signal of the flowmeter 13 is input to the control device 12.

In the case where a flow rate detected by the flowmeter 13 varies by 5% or more from a stable value up to that point, the control device 12 opens the degassing valve 9 for a predetermined time for degassing. Other configurations and effects are the same as in FIG. 1, and the same reference numerals indicate the same portions.

Also in this embodiment, ultrapure water containing the second liquid having a specified concentration is stably supplied to the use point.

EXAMPLES

Examples and comparative examples are described below.

Example 1

By use of the dilute solution production apparatus shown in FIG. 1, a 29% $NH_3$ solution was supplied from the tank 4 by the pump 6, added to ultrapure water in the pipe 1 that passed at 60 L/min, and a solution having a conductivity of 3 μS/cm was prepared. The water quality sensor 11 used was a conductivity meter. At the moment when the conductivity dropped by 5% from a set value, the degassing valve 9 was opened for 5 seconds for degassing, and then the degassing valve 9 was closed to return to a normal state. This test was continued for 30 days during which the conductivity detected by the conductivity meter 11 never decreased by 10% or more from the set value.

Example 2

The operation was performed in the same manner as in Example 1 except that a 29% $NH_3$ solution was added so as to obtain a conductivity of 1500 μS/cm. This test was continued for 30 days during which the conductivity detected by the conductivity meter 11 never decreased by 10% or more from the set value.

Example 3

The operation was performed in the same manner as in Example 1 except that the ultrapure water was passed at 3 L/min. This test was continued for 30 days during which the conductivity detected by the conductivity meter 11 never decreased by 10% or more from the set value.

Example 4

By use of the dilute solution production apparatus shown in FIG. 2, a 29% $NH_3$ solution was added at the same ultrapure water flow rate (60 L/min) and target conductivity (3 μS/cm) as in Example 1.

In Example 4, at the moment when the flow rate was detected to be 0 by the flowmeter 13, the degassing valve 9 was controlled to open for 5 seconds for degassing, and then the degassing valve 9 was controlled to close to return to the normal state. This test was continued for 30 days during which the conductivity detected by the conductivity meter 11 never decreased by 10% or more from the set value.

Example 5

By use of the apparatus of FIG. 1, the liquid in the tank 4 was set as a 60% $H_2O_2$ solution, the ultrapure water flow rate was set to 60 L/min, an oxidation-reduction potential meter was used as the water quality sensor 11, and $H_2O_2$-containing ultrapure water having an $H_2O_2$ concentration of 0.5 ppb was supplied to the use point. At the moment when an oxidation-reduction potential detected by the oxidation-reduction potential meter 11 dropped by 5% from the set value, the degassing valve 9 was controlled to open for 5 seconds for degassing, and then the degassing valve 9 was controlled to close to return to the normal state.

This test was continued for 30 days during which the oxidation-reduction potential detected by the oxidation-reduction potential meter 11 never decreased by 10% or more from the set value.

Example 6

The operation was performed in the same manner as in Example 5 except that $H_2O_2$ was added so that the $H_2O_2$ concentration in the ultrapure water was 1000 ppb. This test was continued for 30 days during which the oxidation-reduction potential detected by the oxidation-reduction potential meter 11 never decreased by 10% or more from the set value.

Example 7

The operation was performed in the same manner as in Example 5 except that the ultrapure water flow rate was set to 3 L/min. This test was continued for 30 days during which the oxidation-reduction potential detected by the oxidation-reduction potential meter 11 never decreased by 10% or more from the set value.

Example 8

By use of the dilute solution production apparatus shown in FIG. 2, the operation was performed so as to supply ultrapure water having an $H_2O_2$ concentration of 0.5 ppb at the same ultrapure water flow rate and target oxidation-reduction potential as in Example 5. In Example 8, at the moment when the flow rate was detected to be 0 by the flowmeter 13, the degassing valve 9 was controlled to open for 5 seconds for degassing, and then the degassing valve 9 was controlled to close to return to the normal state. This test was continued for 30 days during which the oxidation-reduction potential detected by the oxidation-reduction potential meter 11 never decreased by 10% or more from the set value.

Comparative Examples 1 to 3

Figure 3:
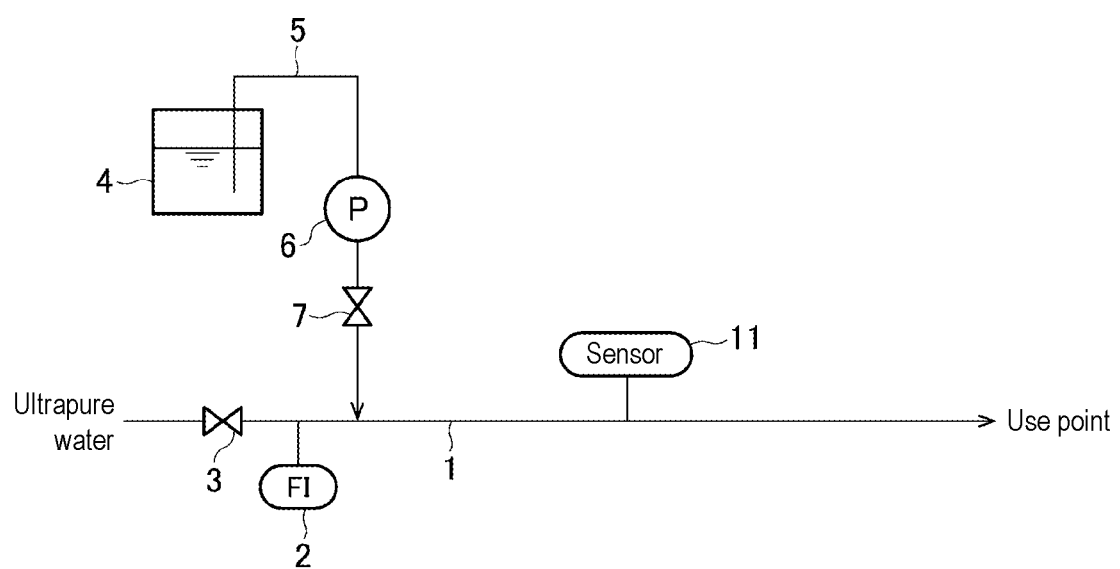
FIG. 3 is a configuration diagram of a dilute solution production apparatus according to a comparative example.

The operation was performed under the same conditions as in Examples 1 to 3 respectively except that an apparatus without the degassing pipe 8 and the degassing valve 9 was used, as shown in FIG. 3. The time until the conductivity decreased by 10% of the set value was measured. The results are shown in Table 1.

Comparative Examples 4 to 6

The operation was performed under the same conditions as in Examples 5 to 7 respectively except that an apparatus without the degassing pipe 8 and the degassing valve 9 was used, as shown in FIG. 3. The time until the $H_2O_2$ concentration decreased by 10% of the set value was measured. The results are shown in Table 1.

TABLE 1

| | Apparatus | Ultrapure water flow rate | Second liquid | Set conductivity or concentration | Degassing | Time until deviating from ±10% |
|---|---|---|---|---|---|---|
| Example 1 | FIG. 1 | 60 L/min | 29% $NH_3$ | Conductivity of 3 μS/cm | Yes | None for 30 days or more |
| Example 2 | FIG. 1 | 60 L/min | 29% $NH_3$ | Conductivity of 1500 μS/cm | Yes | None for 30 days or more |
| Example 3 | FIG. 1 | 3 L/min | 29% $NH_3$ | Conductivity of 3 μS/cm | Yes | None for 30 days or more |
| Example 4 | FIG. 2 | 60 L/min | 29% $NH_3$ | Conductivity of 3 μS/cm | Yes | None for 30 days or more |
| Example 5 | FIG. 1 | 60 L/min | 60% $H_2O_2$ | $H_2O_2$ 0.5 ppb | Yes | None for 30 days or more |
| Example 6 | FIG. 1 | 60 L/min | 60% $H_2O_2$ | $H_2O_2$ 1000 ppb | Yes | None for 30 days or more |
| Example 7 | FIG. 1 | 3 L/min | 60% $H_2O_2$ | $H_2O_2$ 0.5 ppb | Yes | None for 30 days or more |
| Example 8 | FIG. 2 | 60 L/min | 60% $H_2O_2$ | $H_2O_2$ 0.5 ppb | Yes | None for 30 days or more |
| Comparative Example 1 | FIG. 3 | 60 L/min | 29% $NH_3$ | Conductivity of 3 μS/cm | No | 13 hr |
| Comparative Example 2 | FIG. 3 | 60 L/min | 29% $NH_3$ | Conductivity of 1500 μS/cm | No | 30 hr |
| Comparative Example 3 | FIG. 3 | 3 L/min | 29% $NH_3$ | Conductivity of 3 μS/cm | No | 17 hr |
| Comparative Example 4 | FIG. 3 | 60 L/min | 60% $H_2O_2$ | $H_2O_2$ 0.5 ppb | No | 38 hr |
| Comparative Example 5 | FIG. 3 | 60 L/min | 60% $H_2O_2$ | $H_2O_2$ 1000 ppb | No | 85 hr |
| Comparative Example 6 | FIG. 3 | 3 L/min | 60% $H_2O_2$ | $H_2O_2$ 0.5 ppb | No | 45 hr |

As is clear from Table 1, according to the present invention, ultrapure water containing $NH_3$ or $H_2O_2$ at a specified dilute concentration can be stably supplied to the use point.

Although the present invention has been described in detail using specific embodiments, it will be apparent to those skilled in the art that various modifications can be made without departing from the intent and scope of the invention.

The present application is based on Japanese Patent Application No. 2020-404474 filed on Mar. 13, 2020, which is incorporated by reference in its entirety.

DESCRIPTION OF REFERENCE NUMERALS

1: first pipe
2: flowmeter
4: tank
5: second pipe
6: pump
7: flow regulating valve
8: degassing pipe 9: degassing valve
11: water quality sensor
12: control device
13: flowmeter

What is claimed is:

1. A dilute solution production apparatus, producing a dilute solution of a second liquid containing ammonia or hydrogen peroxide by adding the second liquid to a first liquid, wherein the dilute solution production apparatus comprises:
   a first pipe through which the first liquid flows;
   a pump adding the second liquid into the first pipe via a second pipe;
   a degassing mechanism extending from the pump;
   a water quality detector composed of a conductivity meter, a resistivity meter, or an oxidation-reduction potential meter, provided in the first pipe at a location downstream of a connection part of the first pipe and the second pipe;
   a degassing mechanism control part operating the degassing mechanism when a water quality detection value of the water quality detector varies by a predetermined value or more; and
   a tank storing the second liquid,
   wherein the second pipe is connected to the tank,
   wherein the degassing mechanism comprises a degassing pipe for guiding the second liquid mixed with a gas from the pump to the tank, and a valve provided in the degassing pipe,
   wherein when the water quality detection value varies by 1% to 10% from a predetermined target value, the degassing mechanism control part opens the valve for a predetermined time, returns the second liquid mixed with the gas from the pump to the tank, and closes the valve after passage of the predetermined time.

2. A dilute solution production apparatus, producing a dilute solution of a second liquid containing ammonia or hydrogen peroxide by adding the second liquid to a first liquid, wherein the dilute solution production apparatus comprises:
   a first pipe through which the first liquid flows;
   a pump adding the second liquid into the first pipe via a second pipe;
   a degassing mechanism extending from the pump;
   a flowmeter provided downstream of the pump in the second pipe;
   a degassing mechanism control part operating the degassing mechanism when a detection value of the flowmeter varies by a predetermined value or more; and
   a tank storing the second liquid,
   wherein the second pipe is connected to the tank,
   wherein the degassing mechanism comprises a degassing pipe for guiding the second liquid mixed with a gas from the pump to the tank, and a valve provided in the degassing pipe,
   wherein when the detection value varies by 1% to 10% from a predetermined target value, the degassing mechanism control part opens the valve for a predetermined time, returns the second liquid mixed with the gas from the pump to the tank, and closes the valve after passage of the predetermined time.

* * * * *